United States Patent [19]

Howe

[11] Patent Number: 4,947,720

[45] Date of Patent: Aug. 14, 1990

[54] DIE IMPROVEMENT

[75] Inventor: Conrad L. Howe, Greene, Ark.

[73] Assignee: Emerson Electric Co., St. Louis, Mo.

[21] Appl. No.: 402,670

[22] Filed: Sep. 5, 1989

[51] Int. Cl.[5] .............................................. B26F 1/00
[52] U.S. Cl. ...................................... 83/146; 83/685; 83/690
[58] Field of Search ................. 83/109, 111, 685, 690, 83/688, 687, 691, 132

[56] References Cited

U.S. PATENT DOCUMENTS

| | | | |
|---|---|---|---|
| 2,284,956 | 6/1942 | Gardner | 83/690 |
| 2,365,977 | 12/1944 | Stine et al. | 83/685 |
| 2,378,562 | 6/1945 | Lahr | 83/690 |
| 4,091,700 | 5/1978 | Cloup | 83/132 |
| 4,516,450 | 5/1985 | Shuttleworth | 83/685 |
| 4,543,865 | 10/1985 | Kramski | 83/685 |

Primary Examiner—Frank T. Yost
Assistant Examiner—Hwei-Siu Payer
Attorney, Agent, or Firm—Polster, Polster and Lucchesi

[57] ABSTRACT

A punch press die (D) is used to construct rotor laminations (RL) and stator laminations (SL) for a dynamoelectric machine (1). A cavity (17) is formed in the die for a punch (15) to travel through and stamp a slot (5) in a strip (3) of material. Opposing side walls (21A, 21B) of the die form the cavity and each side wall has a longitudinal groove (25A, 25B). Each groove is inclined across the face of the wall from one end to the other, the grooves being inclined in opposite directions. In the preferred embodiment, the grooves are oriented about the center-lines of their respective side walls and have a co-planar point (MP) mid-way along their length. Material clinging to the striking face (24) of the punch (115) as it moves through the cavity tends to expand into the grooves and is drawn off from the face of the punch.

5 Claims, 3 Drawing Sheets

DIE IMPROVEMENT

BACKGROUND OF THE INVENTION

This invention relates to the manufacture of stator and rotor laminations for use in dynamoelectric machines such as electric motors and more particularly, to an improvement in a die used in the manufacture of such laminations. While the invention is described in detail with respect to lamination manufacture, those skilled in the art will recognize the wider applicability of the inventive principles described hereinafter.

As is well known in the electrical arts, dynamoelectric machines such as electric motors include stator and rotor assemblies which are constructed from stacks of individual laminations formed from suitable electrical material. Typically, the laminations are formed in a multi-station punch press in to which a strip of metal stock is fed. The strip passes through successive work stations where the the stator and rotor laminations are formed in a variety of steps. In producing both types of laminations, one step performed is to stamp out slots or other configurations in the metal to form, for example, a vent, winding receiving slots, or index openings.

A progressive die is used in these stamping operations. The die has a cavity through which a punch travels to strike the material and punch out the appropriate configuration. Stamping of metal parts in this way is a well recognized manufacturing process. One problem occurring when material is punched from a strip is that some of the perforated or punched out material tends to stick to the striking face of the punch and is brought back through the strip. If the material is still clinging to the face during the next stamping cycle, the punch, in effect, will be trying to punch through a double thickness of material. If the material does not stick to the punch, it often falls on the upper surface of the strip. Again, succeeding operations of the punch press will be trying to punch through a double thickness of material. This problem is known in the art as "slugging". Repetitive operation of the die once "slugging" occurs causes a variety of problems. For example, the next operation of the die can improperly deform the work piece. The die itself may be damaged because the punch and die are not designed to stamp a double thickness of material. In any event, down time of the punch press occurs because, at a minimum, the strips being punched must be removed, the damaged portion eliminated and the strip reinserted in the press before operations are again commenced. Such down time occurrences, of course, decrease production and increase cost.

Various techniques have been tried to prevent or control "slugging". Among these are: grinding of the cutting edges of the punches at an angle to the die plate, notching the punches, and dulling the cutting edges of the punches. None of the previous techniques with which I am familiar have been found to be completely successful.

SUMMARY OF THE INVENTION

Among the several objects of the present invention may be noted an improvement in the manufacture of a part from a strip of material fed into a punch press; the provision of such an improvement in the manufacture of stator and rotor laminations for a dynamoelectric machine; the provision of such improvement wherein side walls forming cavities in a punch press die each have grooves formed therein; the provision of such improvement wherein the grooves extend a predetermined length in the cavity, are inclined with respect to the center line of the cavity wall, are oppositely inclined with respect to each other, and have a co-planar point within the cavity; the provision of such a improvement to prevent "slugging" by removing material from the face of the punch contacting the material as the punch moves through the cavity; the provision of such improvement to draw material clinging to the face of the punch into the grooves so to remove it from the punch face; the provision of such improvement wherein the die has a number of cavities each of which has grooves formed in the side walls of the cavity; and, the provision of such an improvement to prevent damage to the die or to the material being processed.

Briefly, a punch press die for manufacturing a part from a strip of material, for example, stator and rotor laminations for a dynamoelectric machine such as an electric motor, has a series of progressive stations, at least some of which include at least one cavity into which a punch travels to strike material from the strip. The cavity defining portion of the die has opposing side walls forming the cavity and each side wall has a longitudinal groove extending along the length of the side wall. The respective grooves are inclined with respect to the centerline of their associated side wall and the inclination of the groove in one side wall is opposite to that in the other. As a consequence, the respective grooves have a co-planar point approximately along the length of the cavity. The grooves serve to remove material from the face of the punch contacting the strip. Such material tends to expand into or catch on the grooves as the punch moves reciprocally into the cavity and then is drawn off as the punch returns to its initial position. Removal of the material prevents "slugging" and damage to the die as the punch repetitively strikes the strip. Other objects and features will be in part apparent and in part pointed out hereinafter.

BRIEF DESCRIPTION OF THE DRAWINGS

In the drawings.

Corresponding reference characters indicate corresponding parts throughout the several views of the drawings.

DESCRIPTION OF THE PREFERRED EMBODIMENT

Figure 1:
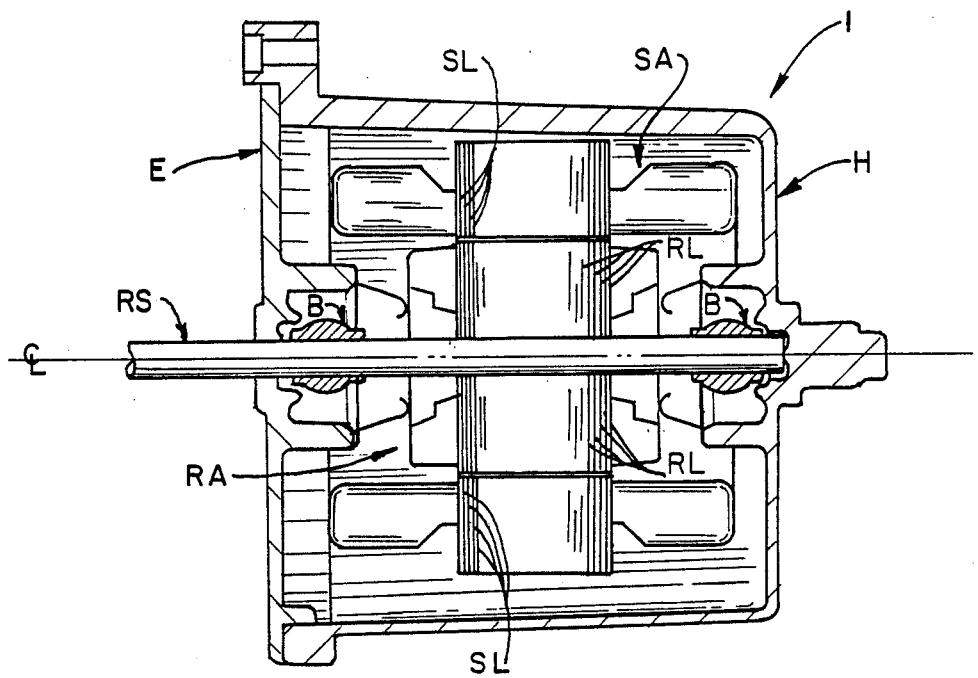
FIG. 1 is a cross-sectional view of a dynamoelectric machine such as a motor illustrating the rotor and stator assemblies of the machine.

Referring to the drawings, a dynamoelectric machine is indicated generally by the reference numeral 1 in FIG. 1. The machine, which is an electric motor in the embodiment illustrated, includes a housing H in which is installed a stator assembly SA, a rotor assembly RA, and a rotor shaft RS. The rotor shaft is journalled in bearings B mounted in respective end shields E. The shaft RS extends through at least one end shield E. As is well known in the art, electrical energy supplied to the motor produces a mechanical output. The motor is connected to a using system or appliance (not shown) for the rotary motion of the shaft to be translated into work.

As shown in FIG. 1, both the stator and rotor assemblies each are constructed from a plurality of individual laminations formed from suitable electrically conductive material, and are demonstrated as stator laminations SL, and rotor laminations RL. The respective laminations are formed during a punch press operation. The laminations so produced are formed together into stacks or assemblies, interconnected by means known in the art, and when other components are incorporated therewith, form the stator and rotor assemblies.

As shown in FIGS. 7A–D and 8, the respective laminations are formed by feeding a strip 3 of metal into a punch press P. The press preferably includes a processing die which defines a series of stations by which the strip is progressively worked to form the stator and rotor laminations.

Figure 4:
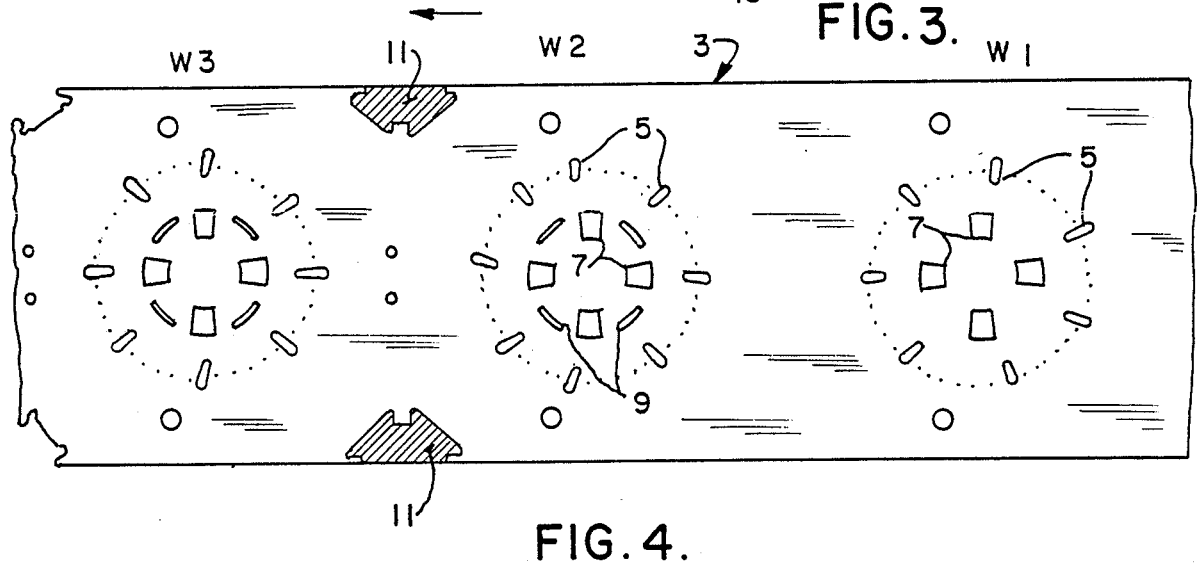
FIG. 4 is a top plan view of a strip of material fed into a press to create rotor and stator laminations and illustrates a portion of the operations performed at successive work stations to create the laminations.

Referring to FIG. 4, the first three stations are illustrated. Movement of strip 3 through the press is indicated by the arrow. Those skilled in the art will recognize that there may be earlier work stations in the die. I have demonstrated the stations herein based on work performed for lamination construction. At station W1, rotor slots 5 and vent slots 7 are punched into the portion of the strip forming a rotor lamination RL. It will be understood that more slots 5 than are shown are formed in the material at station W1, but are not shown for sake of drawing clarity. At station W2, rotor lamination interlocks 9 are formed. At station W3, the shaded areas designated 11 are removed from the strip. It will be understood that as the strip 3 successively moves through the die stations, a rotor lamination RL is punched out of the strip. After that operation is performed, stator slots 13 are formed in the portion of the strip which will comprise a stator lamination SL. As the final step in the sequence, the stator lamination is cut off from the strip. Other construction sequences can be used, if desired.

Figure 2:
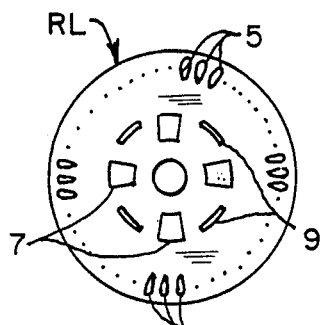
FIGS. 2 and 3 respectively represent a rotor lamination and a stator lamination.
Figure 3:
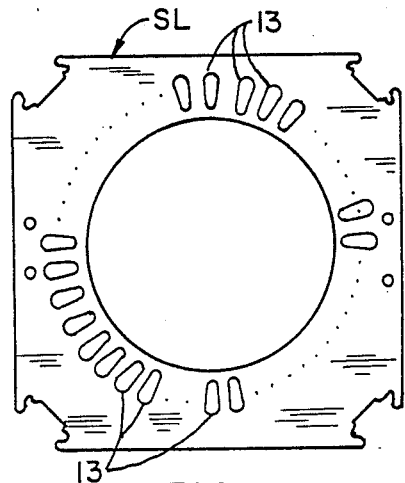
Figure 5:
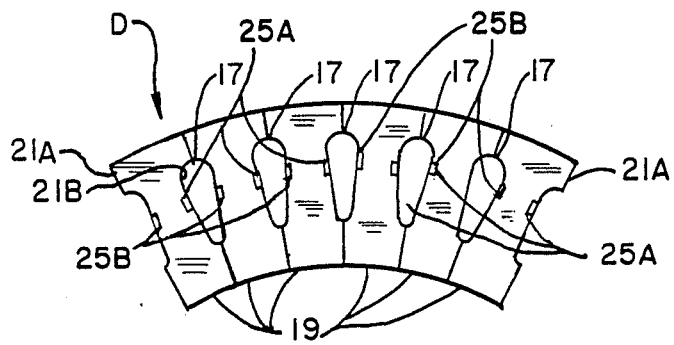
FIG. 5 is a plan view of a portion of one station for a die illustrating a number of die segments with respective cavities formed thereby.

As is indicated in FIGS. 2, 3, and 4, numerous slots are formed in the various rotor and stator laminations. These slots are formed by the movement of a series of punches passing through corresponding cavities in the die. For purposes of description, the drawings illustrate a punch 15 passing through a cavity 17 formed in die D. Referring to FIG. 5, die D is formed of a plurality of die segments 19. The die segments 19 shown in FIG. 5 form only an arcuate portion of the number of die segments which are assembled to form the die at a particular station W. The die, as thus assembled, is used to punch the plurality of circumferential slots 5 as shown in FIGS. 2 or 4, for example, at a selected station for that operation.

Figure 6A:
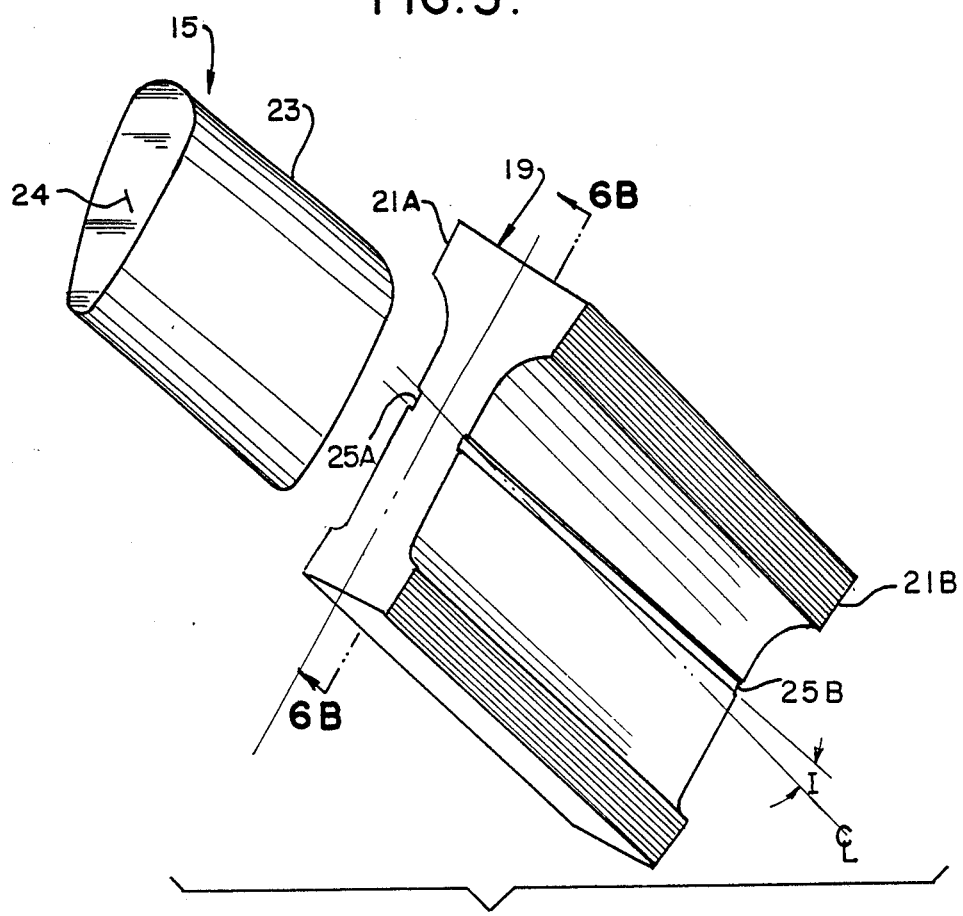
FIG. 6A is a perspective view of a die segment and a punch which travels through a cavity partially formed by the die segment.

Referring to FIG. 6A, each die segment 19 has respective side walls 21A and 21B. The central section of the respective side walls are each formed or contoured so when adjacent segments 19 are assembled, a cavity 17 is created. As shown in FIG. 6A, punch 15 has an elongate portion 23 which travels into die D; and, in particular, through the cavity 17 created by adjacent die segments. Portion 23 is semi-eliptical in cross section, one end of the portion having a greater diameter than the other so the portion has a tapered design. The side walls 21A and 21B of a die segment 19 are shaped so to conform to this tapered design. As will be appreciated, other designs may be used.

Figure 7B:
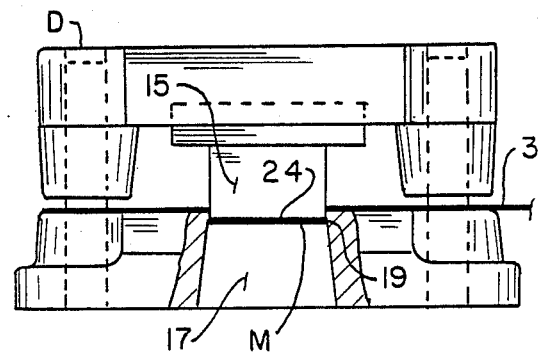
FIGS. 7A–7D illustrate the movement of the punch through a die segment during one cycle of a punch press operation; and, FIG. 8 is an elevational view of a punch press in which the improvement of the present invention is incorporated.
Figure 7C:
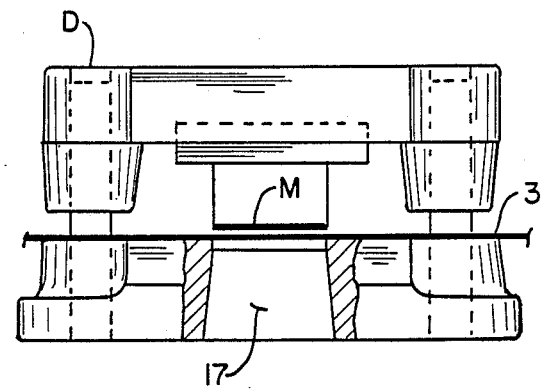
Figure 8:
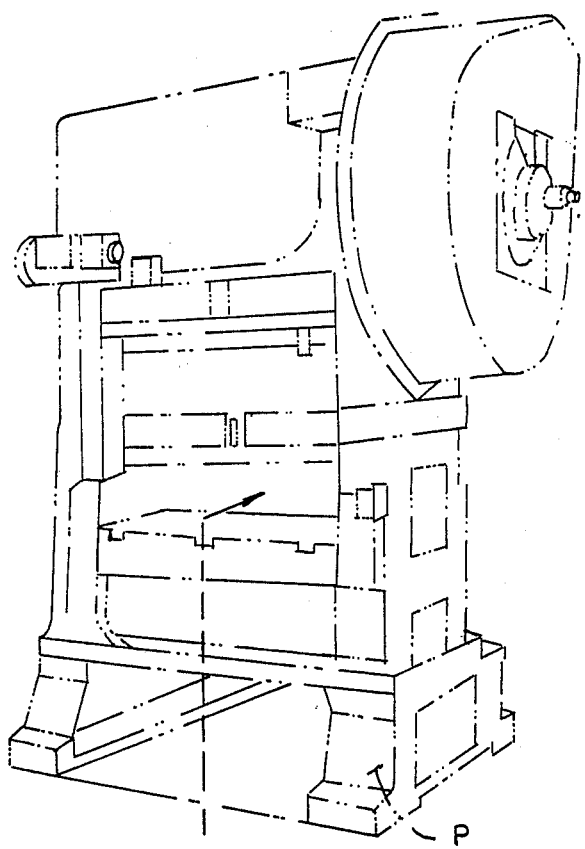
Figure 7A:
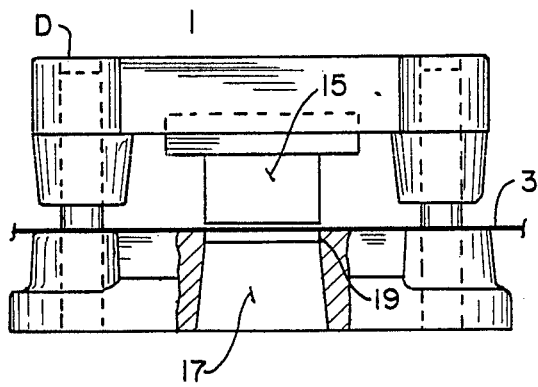
Figure 7D:
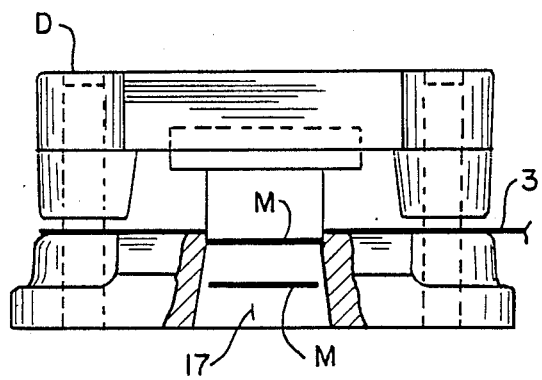

The operation of punch 15 in die D is shown in FIGS. 7A–7D. The drawings have been simplified for description purposes. In FIG. 7A, punch 15 is shown in the starting position. In FIG. 7B, the punch 15 moves downward to impact strip 3. The portion of material essentially, is sheared against the edge of die segment 19. In FIG. 7B, the punch has punched die segment 19. In FIG. 7C, the punch 15 is withdrawn from the cavity 17 prior to the strip being indexed to the next work station in the press. Finally, in FIG. 7D, the punch is moved downward again to impact a new portion of strip 3.

Referring to FIG. 7B and 7C, the problem often encountered during a stamping operation is illustrated. As shown in FIG. 7B when punch 15 stamps material from strip 3, a portion of the perforated material may adhere to face 24 of the punch. Adhering material is indicated at M in FIG. 7B. When the punch is withdrawn from cavity 17, as shown in FIG. 7C, the material M may continue to adhere to the end of the punch and can ride above the upper surface of the strip 3. Prior to the improvement to the present invention, when the punch made its next downward stroke to strike strip 3, the material M on the end of the punch, caused the punch to act as though it were striking a double thickness of material (the material comprising strip 3 and the material M adhering to the striking end of the punch). Such a condition is called "slugging" and can cause damage to the punch, the material strip 3, or both. For example, the punch may not be driven with sufficient force to punch a new hole through the strip 3 of material, and this results in a defective part. Or, even if the punch has sufficient force to penetrate the two thicknesses of material, the force distribution may be such that the hole punched in the material is ragged and hence still causes a defective part to be produced. As indicated above, these conditions cause press down time and increased cost.

Figure 6B:
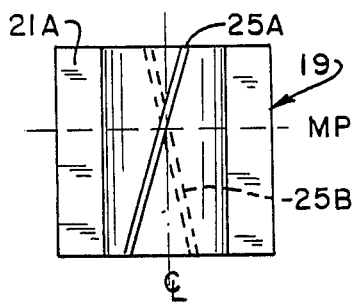
FIG. 6B is taken along line 6B in FIG. 6A.

Referring again to FIG. 6A, an improvement of the present invention is the formation of a longitudinal groove, 25A and 25B respectively, in each side wall 21A and 21B of the die segment. In the embodiment illustrated, the grooves extend the length of their respective side walls. As best shown in FIG. 6B, the respective grooves are inclined with respect to the centerline of their associated side wall and the inclination or slope of the groove in one side wall forming a cavity is opposite to that of the groove in the other side wall. Thus, groove 25A is inclined in the opposite direction with respect to the center line than groove 25B. Consequently, the opposing side walls forming a cavity 17 have oppositely oriented or angled grooves 25A and 25B. Preferably, the angle (angle I as shown in FIG. 6A) of inclination is between approximately 0.5° and approximately 3.0° with respect to the center line.

When the grooves are viewed as shown in FIG. 6B, it will be seen that the grooves have a co-planar point only at about mid point MP along the length of cavity 17.

Referring again to FIGS. 7A–7D, the importance of the oppositely inclined grooves 25A and 25B can be appreciated. Referring to FIG. 7C, as punch 15 is withdrawn from cavity 17, material M clinging to the end of the punch may move with it. While the exact reason why the groove arrangement functions to resolve slugging is not known, I believe the material M tends to engage into the grooves 25A and 25B. Now, as the punch again moves outwardly of cavity 17 toward strip 3, the material M is drawn off striking face 24 of punch 15 into the respective grooves. As a result, by the time the striking end of punch 15 again reaches strip 3, all the material previously adhering to the end of the punch has been removed. Face 24 of the punch is now clear and can properly punch a hole through strip 3. The "slugging" problem previously encountered has been eliminated. During successive press cycles, the material M drawn off the striking face of punch 15 moves downward through the grooves and out the lower end of cavity 17 where the material is drawn away from the die.

It would be obvious to those skilled in the art that many variations of the present invention as disclosed and claimed herein are possible without departing from the coverage of the invention as claimed. For example, the shape of the cavity may vary, depending on the configuration being punched. The angle of the respective grooves may be altered in other embodiments of the invention. These variations are merely illustrative.

Having thus described the invention, what is claimed and desired to be secured by Letters Patent is:

1. In a punch press die for manufacturing a part from a strip of material fed into the press, the die having a cavity therein into which a punch travels to stamp out material from the strip, the improvement wherein the die has opposing side walls forming the cavity with each side wall having a longitudinal groove formed therein, the respective grooves being angularly offset throughout their length with respect to a predetermined axis of their respective side wall, the annular offset of one groove being offset in an opposite direction to that of the other groove, the grooves having a single co-planar point which lies on the intersection of two transverse planes, and the predetermined angular offset of the oppositely directed grooves being sufficient to cause slidable wedging groove engagement of stamped out material peripheral portions which are complementary to the grooves in order to remove stamped out material which would otherwise adhere to the face of the punch during the punching operation, thereby to prevent "slugging" and damage to the die as the punch repetitively strikes the strip of material.

2. The improvement of claim 1 wherein each grooves extends the length of its respective side wall and the single co-planar point between the two grooves is located about the midpoint along the length of each die side wall.

3. The improvement of claim 2 wherein the die has a plurality of cavities through which respective punches travel, the opposing side walls forming each cavity having oppositely inclined grooves.

4. The improvement of claim 3 wherein the die is comprised of a plurality of die segments, each segment having a side wall forming a portion of one cavity and a side wall forming a portion of an adjacent cavity, the respective side walls having oppositely inclined grooves.

5. The improvement of claim 1 wherein each side wall has a center-line with respect to which the respective groove therein is inclined and the angle of inclination between the grooves and their respective center-line is between approximately 0.5° and approximately 3.0°.

* * * * *